(12) United States Patent
Yen

(10) Patent No.: US 9,396,893 B2
(45) Date of Patent: Jul. 19, 2016

(54) MAGNETIC KEYSWITCH AND RELATED KEYBOARD

(71) Applicant: DARFON ELECTRONICS CORP., Taoyuan (TW)

(72) Inventor: Chih-Chung Yen, Taoyuan (TW)

(73) Assignee: DARFON ELECTRONICS CORP., Gueishan, Taoyuan (TW)

( * ) Notice: Subject to any disclaimer, the term of this patent is extended or adjusted under 35 U.S.C. 154(b) by 177 days.

(21) Appl. No.: 14/495,905

(22) Filed: Sep. 25, 2014

(65) Prior Publication Data

US 2015/0101917 A1  Apr. 16, 2015

(30) Foreign Application Priority Data

Oct. 11, 2013  (TW) .............................. 102136817 A

(51) Int. Cl.
  *H01H 36/00*  (2006.01)
  *H01H 13/84*  (2006.01)
  *H01H 3/12*  (2006.01)
  *G06F 3/02*  (2006.01)

(52) U.S. Cl.
  CPC ............. *H01H 13/84* (2013.01); *G06F 3/0221* (2013.01); *H01H 3/12* (2013.01); *H01H 3/125* (2013.01); *H01H 2215/002* (2013.01); *H01H 2221/04* (2013.01); *H01H 2223/052* (2013.01); *H01H 2231/002* (2013.01)

(58) Field of Classification Search
  CPC .... H01H 13/7065; H01H 13/14; H01H 3/125
  USPC ............................ 200/5 A, 344; 335/205–207
  See application file for complete search history.

(56) References Cited

U.S. PATENT DOCUMENTS

| 7,262,374 B2 * | 8/2007 | Takatsuka | G06F 3/0202 200/5 A |
| 2008/0264770 A1 * | 10/2008 | Purcocks | H01H 13/7065 200/521 |
| 2012/0313738 A1 * | 12/2012 | Chang | H01H 13/702 335/205 |
| 2014/0168875 A1 * | 6/2014 | Nakamura | G06F 1/1666 361/679.09 |
| 2016/0118203 A1 * | 4/2016 | Moua | H01H 13/705 307/115 |

FOREIGN PATENT DOCUMENTS

| CN | 1453689 A | 11/2003 |
| CN | 203165759 U | 8/2013 |
| CN | 103325604 A | 9/2013 |

* cited by examiner

*Primary Examiner* — Renee Luebke
*Assistant Examiner* — Ahmed Saeed
(74) *Attorney, Agent, or Firm* — Winston Hsu; Scott Margo

(57) ABSTRACT

A magnetic keyswitch includes a base, a keycap, a curved supporter, a bracket and a second magnetic portion. The keycap moves relative to the base upwardly and downwardly. The curved supporter is disposed between the keycap and the base and has a first end and a second end. A first magnetic portion is disposed on the first end. The bracket slides relative to the base and is switched between a first position and a second position. The second magnetic portion is disposed on the bracket. An attractive force is generated between the second magnetic portion and the first end when the bracket is located at the first position, so that the second end supports the keycap at a first height. The attractive force is removed when the bracket moves to the second position, and the keycap is descended to a second height by an external force.

16 Claims, 5 Drawing Sheets

MAGNETIC KEYSWITCH AND RELATED KEYBOARD

BACKGROUND OF THE INVENTION

1. Field of the Invention

The present invention relates to a keyswitch with height adjusting function, and more particularly, to a magnetic keyswitch utilizing a magnetic attractive force to adjust its height and a related keyboard with the foresaid keyswitch.

2. Description of the Prior Art

With the advanced technology, the portable electronic device trends towards the thin-typed aesthetic design. An input interface (such as the keyboard) of the thin-typed electronic device must have the thin-typed design accordingly because of limited configuration space of the thin-typed electronic device. A travel stroke of the thin-typed keyboard is short, the user cannot feel sufficient force feedback when using the thin-typed keyboard, and a keyboard capable of varying its entity structural height is produced to adjust longitudinal height of each keyswitch on the keyboard according to different operation modes of the keyboard. A conventional adjustable keyboard utilizes gravity force to descend a keycap of the each keyswitch to lowest position; however, a drop path of the keycap driven by the gravity force is unstable and the keycap with long-term repetitive usage cannot be descended to the predetermined lowest position accurately. Therefore, design of an adjustable keyswitch and a related keyboard capable of adjusting the structural height and having preferred operational reliability is an important issue of the computer industry.

SUMMARY OF THE INVENTION

The present invention provides a magnetic keyswitch utilizing a magnetic attractive force to adjust its height and a related keyboard with the foresaid keyswitch for solving above drawbacks.

According to the claimed invention, a magnetic keyswitch includes a base, a keycap, a curved supporter, a bracket and a second magnetic portion. The keycap is capable of moving relative to the base upwardly and downwardly. The curved supporter is disposed between the keycap and the base and has a first end and a second end. A first magnetic portion is disposed on the first end. The bracket is capable of sliding relative to the base and switched between a first position and a second position. The second magnetic portion is disposed on the bracket. An attractive force is generated between the second magnetic portion and the first end when the bracket is located at the first position, so that the second end supports the keycap at a first height. The attractive force between the first magnetic portion and the second magnetic portion is removed when the bracket moves to the second position, and the keycap is descended to a second height by an external force.

According to the claimed invention, a keyboard includes abase, a bracket and a plurality of magnetic keyswitches. The bracket is capable of sliding relative to the base and switched between a first position and a second position. The plurality of magnetic keyswitches is movably disposed on the base. Each of the plurality of magnetic keyswitches includes a keycap, a curved supporter and a second magnetic portion. The keycap is capable of moving relative to the base upwardly and downwardly. The curved supporter is disposed between the keycap and the base and has a first end and a second end. A first magnetic portion is disposed on the first end. The second magnetic portion is disposed on the bracket. An attractive force is generated between the second magnetic portion and the first end when the bracket is located at the first position, so that the second end supports the keycap at a first height. The attractive force between the first magnetic portion and the second magnetic portion is removed when the bracket moves to the second position, and the keycap is descended to a second height by an external force.

The magnetic keyswitch and the related keyboard of the present invention utilize the movable bracket to change position of the second magnetic portion relative to the curved supporter. The second magnetic portion can be a permanent magnet or an electric magnet, and the curved supporter can be made of magnetic material. The magnetic attractive force is generated since the second magnetic portion moves close to the curved supporter, so as to drive the curved supporter to upwardly push the keycap. The magnetic attractive force is eliminated since the second magnetic portion is distant from the curved supporter, and the keycap can be descended to the second height by the external force (such as the attractive force provide by the fourth magnetic portion 22B shown in FIG. 7). In addition, the supporting portion can support or be separated from the curved supporter according to a movement of the bracket relative to the base, so that the keycap can be descended with the dropping curved supporter to obviously vary the entity structural height of the magnetic keyswitch and the related keyboard. Comparing to the prior art, the magnetic keyswitch and the related keyboard of the present invention have advantages of simple structure and easy assembly, magnetic attractive application for upward/downward movement of the keycap provides stable operational reliability.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
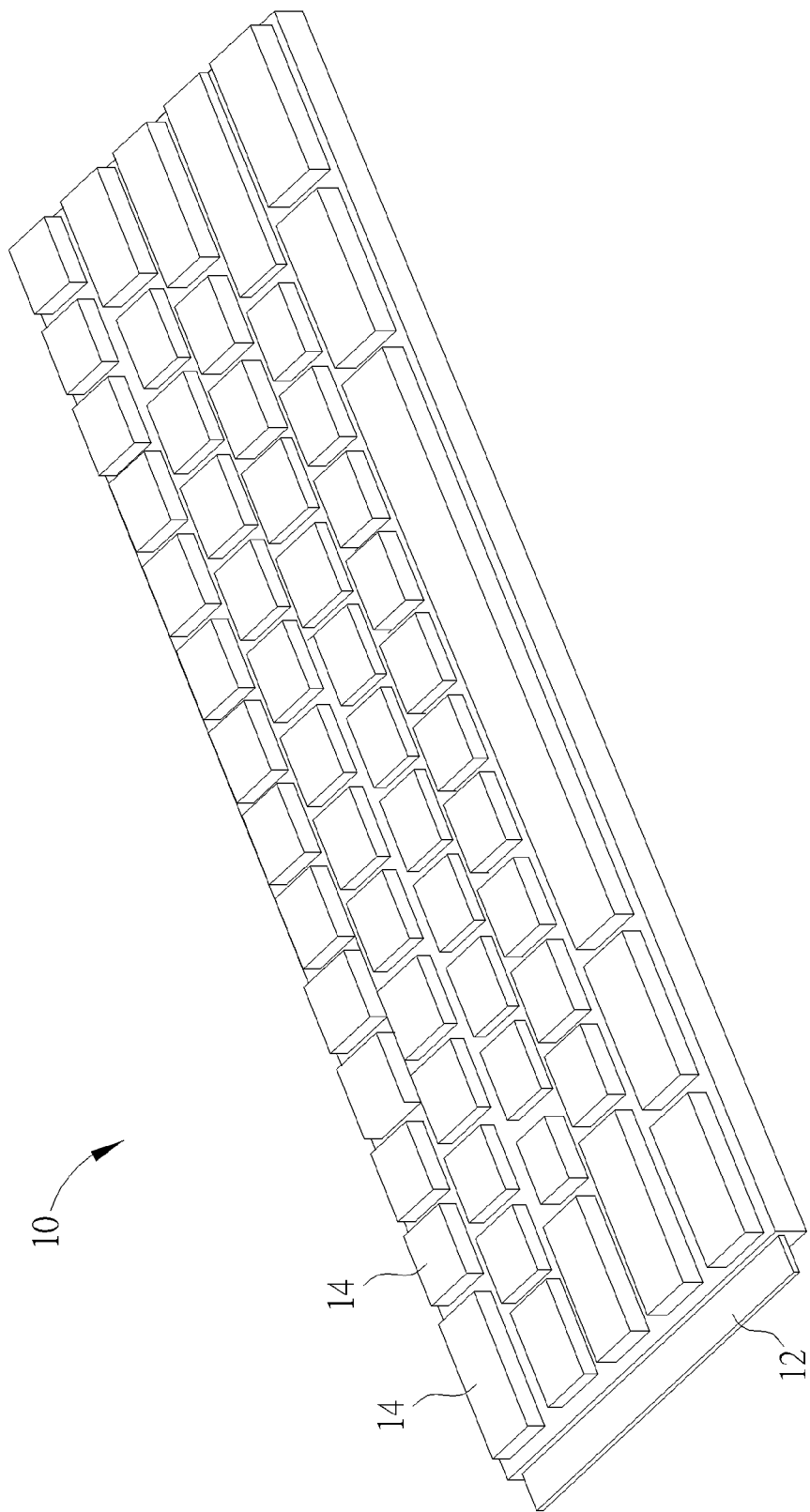
FIG. 1 is a diagram of a keyboard according to an embodiment of the present invention.

Please refer to FIG. 1. FIG. 1 is a diagram of a keyboard 10 according to an embodiment of the present invention. The keyboard 10 includes a bracket 12 and a plurality of keyswitches 14. The keyswitch 14 preferably can be a magnetic keyswitch utilizing a magnetic force to vary relative height between the bracket 12 and the keyswitch 14, which means the keyswitch 14 can be movably disposed on the base 16 upwardly and downwardly. Further, relative height between the keyswitch 14 and bracket 12 may be varied by another driving force. The relative height between the keyswitch 14 and a main body of the keyboard 10 is varied when the bracket 12 is pushed or pulled, so that the keyboard 10 can be preferably suitable for the thin-type electronic device.

Figure 2:
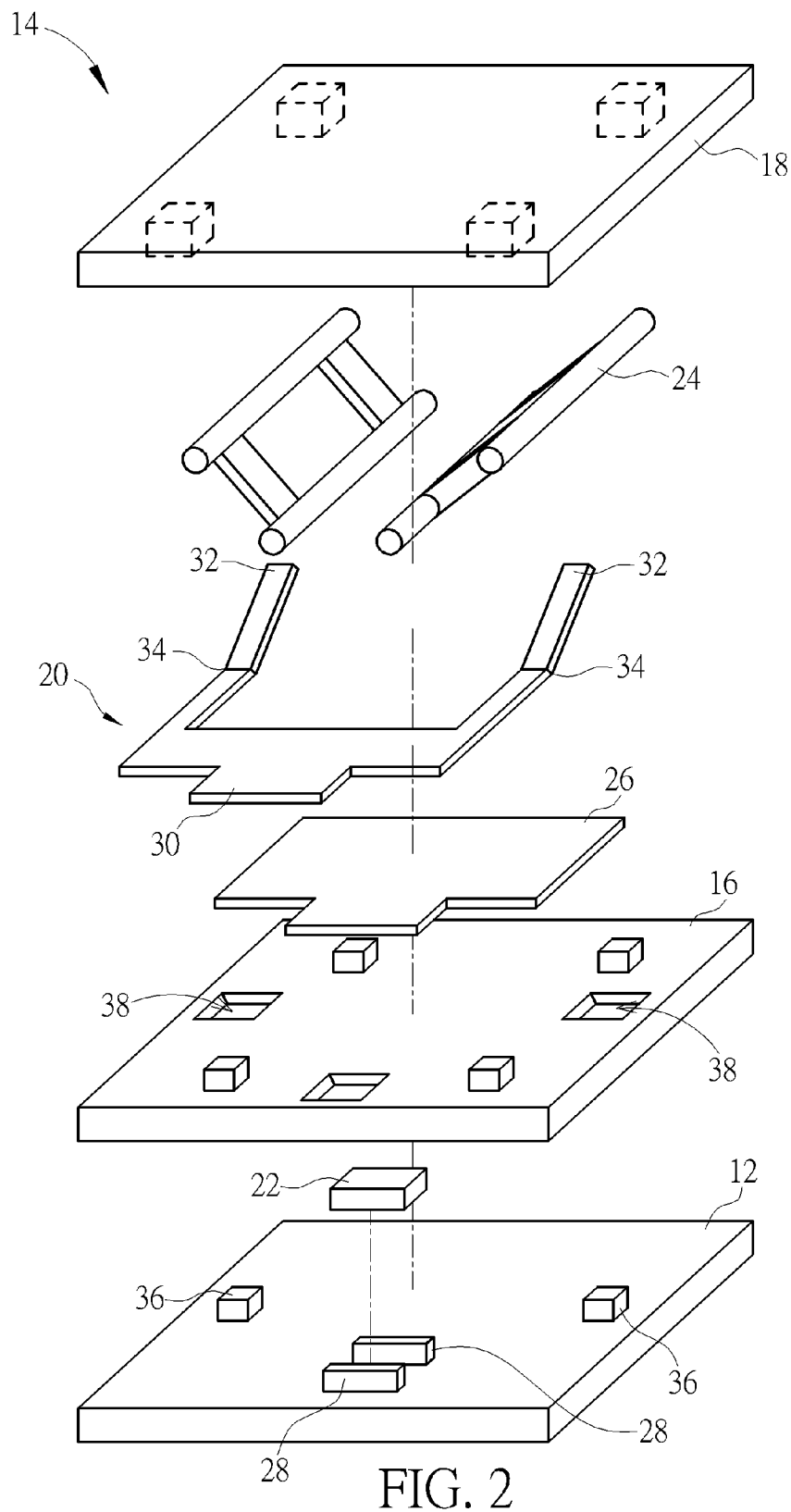
FIG. 2 is an exploded diagram of a magnetic keyswitch according to the embodiment of the present invention.

Please refer to FIG. 2. FIG. 2 is an exploded diagram of the magnetic keyswitch 14 according to the embodiment of the present invention. The keyswitch 14 includes the base 16, a keycap 18, a curved supporter 20, a second magnetic portion 22, a lifting mechanism 24 and a thin film circuit board 26. Two ends of the lifting mechanism 24 are respectively connected to the base 16 and the keycap 18. The keycap 18 moves close to the base 16 according to action of the lifting mechanism 24 when the keycap 18 is pressed by the user's force, so as to actuate a switch of the thin film circuit board 26. The thin film circuit board 26 is disposed on the base 16. When the user's force is removed from the keycap 18, the keycap 18 is lifted by the lifting mechanism 24, the keycap 18 is separated from the base 16 and moves back to an initial position.

As shown in FIG. 2, the bracket 12 is slidably disposed under the base 16. The bracket 12 includes a plurality of constraining components 28, which is utilized to fix the second magnetic portion 22 on an upper surface of the bracket 12. The curved supporter 20 includes a first end 30, a second end 32 and a corner end 34. A first magnetic portion is disposed on the first end 30. The corner end 34 is located between the first end 30 and the second end 32. The curved supporter 20 is disposed between the keycap 18 and the base 16, and the corner end 34 movably contacts a supporting portion 36 of the bracket 12. The base 16 further includes a plurality of guiding slots 38. The corner end 34 is slidably disposed on the corresponding guiding slot 38 to provide rotary/movable tolerance of the curved supporter 20. The first magnetic portion can be a magnet or made of paramagnetic material, and the second magnetic portion 22 can be a magnet or made of paramagnetic material.

Figure 3:
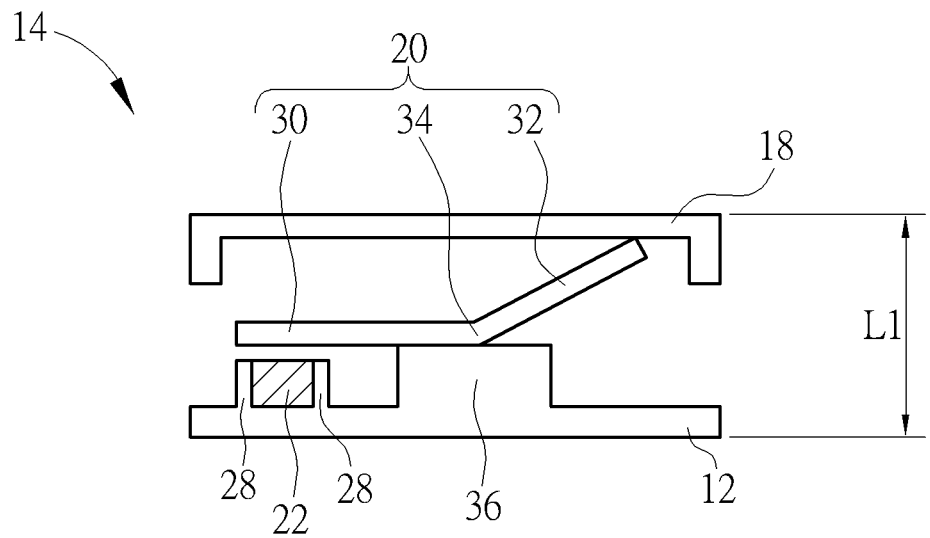
FIG. 3 and FIG. 4 respectively are partial diagrams of the magnetic keyswitch in different operation modes according to the embodiment of the present invention.
Figure 4:
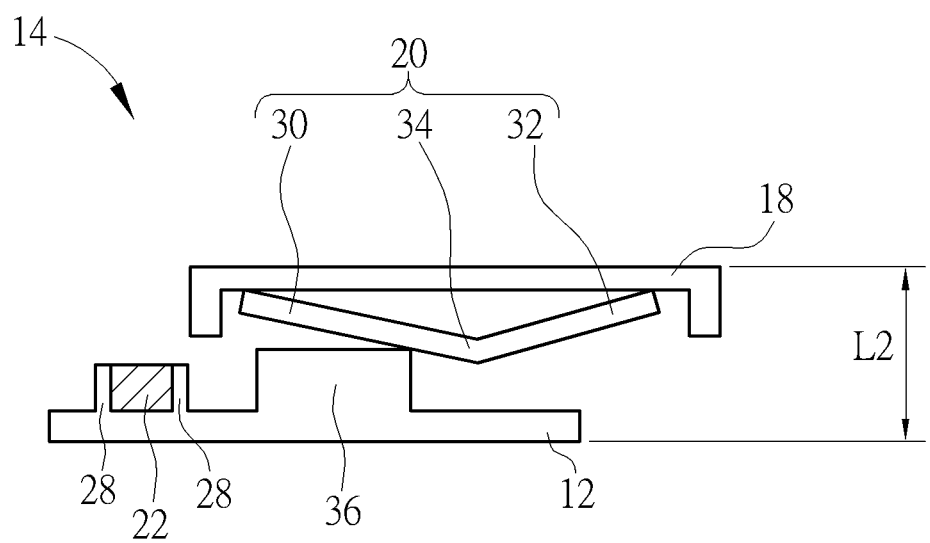

Please refer to FIG. 3 and FIG. 4. FIG. 3 and FIG. 4 respectively are partial diagrams of the magnetic keyswitch 14 in different operation modes according to the embodiment of the present invention. As shown in FIG. 3, the bracket 12 is located at the first position 12, the supporting portion 36 supports the corner end 34 of the curved supporter 20, the second magnetic portion 22 is located adjacent to the first end 30 of the curved supporter 20, and the first end 30 is descended by an attractive force generated from the second magnetic portion 22, so as to drive the second end 32 of the curved supporter 20 to apply an upward supporting force to the keycap 18. The upward supporting force is provided by the curved supporter 20 due to lever principle, and the keycap 18 can stay at higher level position. Generally, the keyswitch 14 shown in FIG. 3 is set as an operable mode, and the keycap 18 can have sufficient pressing stroke for preferred handle feel.

As shown in FIG. 4, the bracket 12 is located at the second position, the supporting portion 36 is separated from the corner end 34, the curved supporter 20 is not supported by the bracket 12, and the curved supporter 20 moves relative to the base 16 downwardly along the guiding slot 38. The guiding slot 38 preferably can be an upright slot to ensure that the curved supporter 20 moves relative to the bracket 12 vertically and always stays under the keycap 18. When the bracket 12 is switched to the second position, the second magnetic portion 22 is distant from the first end 30, the attractive force generated from the second magnetic portion 22 is not applied to the curved supporter 20, the keycap 18 is descended to the second height L2 by the external force (such as gravity force or manual pressure). The keyswitch 14 shown in FIG. 4 is set as a storage mode, to effectively reduce structural height of the keyboard 10 and to economize storage space of the keyboard 10.

When the bracket 12 is switched from the first position shown in FIG. 3 to the second position shown in FIG. 4, the supporting portion 36 is separated from the curved supporter 20, height variation of the curved supporter 20 conforming to entity structural height of the supporting portion 36 is generated; height variation of the keycap 18 relative to the curved supporter 20 is further generated and conforms to difference between the first height L1 and the second height L2. That is, the keycap 18 of the magnetic keyswitch 14 can be moved upward or downward for height adjustment in different operation modes. When the bracket 12 is switched from the second position shown in FIG. 4 to the first position shown in FIG. 3, the supporting portion 36 moves to a position under the corner end 34 to lift the curved supporter 20. The second magnetic portion 22 is utilized to oscillate the curved supporter 20, and the keycap 18 can be lifted by the second end 32 of the curved supporter 20. The bracket 12 further includes an inclined guiding portion 40 disposed on an edge of the supporting portion 36 adjacent to the curved supporter 20. The inclined guiding portion 40 can be an inclined plane structure or an arc surface structure. Any structure capable of upwardly pushing the curved supporter 20 along the guiding slot 38 belongs to scope of the inclined guiding portion of the present invention.

Figure 5:
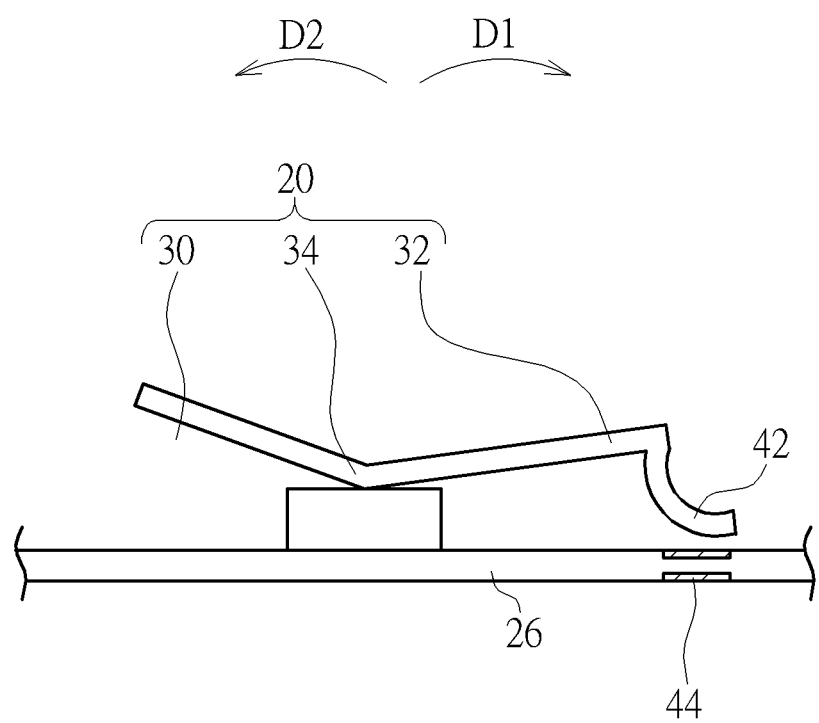
FIG. 5 is a lateral view of a curved supporter and a thin film circuit board according to another embodiment of the present invention.

Please refer to FIG. 2 and FIG. 5. FIG. 5 is a lateral view of the curved supporter 20 and the thin film circuit board 26 according to another embodiment of the present invention. The curved supporter 20 further can include a protruding portion 42 disposed on the second end 32. The protruding portion 42 is the protrusion facing the thin film circuit board 26. When the keycap 18 is pressed, the curved supporter 20 is oscillated via the corner end 34 at the first direction D1, the second end 32 moves downwardly to be close to the thin film circuit board 26, and the protruding portion 42 can contact the switch 44 of the thin film circuit board 22 for actuation. When the keycap 18 is released, the attractive force generated from the second magnetic portion 22 drives the curved supporter 20 to oscillate at the second direction D2, the keycap 18 can be lifted by the lifting mechanism 24 and the second end 32 of the curved supporter 20 and moves back to the initial position (which means the first height).

Figure 6:
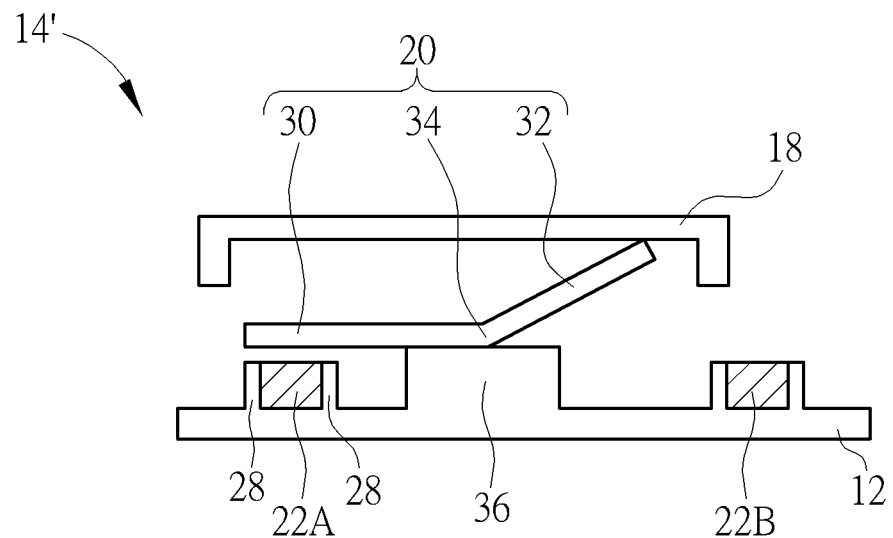
FIG. 6 and FIG. 7 respectively are partial diagrams of the magnetic keyswitch in different operation modes according to another embodiment of the present invention.
Figure 7:
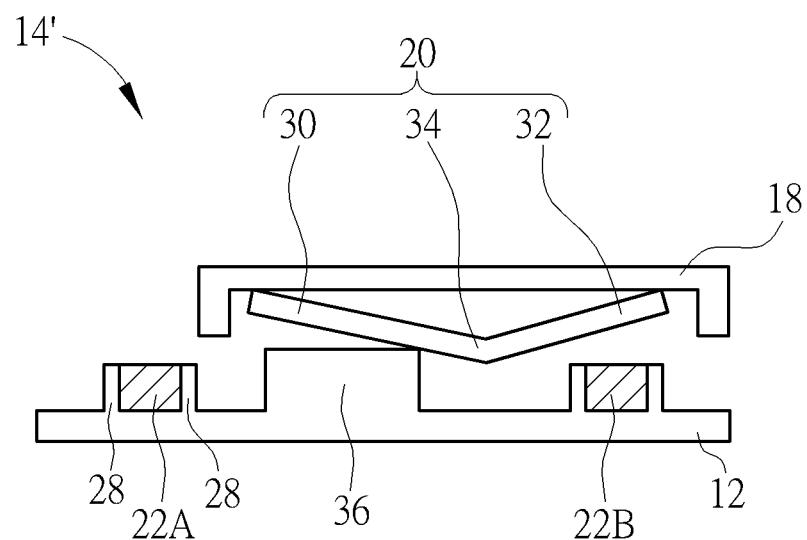

Please refer to FIG. 6 and FIG. 7. FIG. 6 and FIG. 7 respectively are partial diagrams of the magnetic keyswitch 14' in different operation modes according to another embodiment of the present invention. As shown in FIG. 6, the second end 32 further includes a third magnetic portion, and the bracket 12 further includes a fourth magnetic portion 22B. The bracket 12 is located at the first position, the first end 30 of the curved supporter 20 is attracted by the second magnetic portion 22A, and the second end 32 of the curved supporter 20 pushes the keycap 18 upwardly. As shown in FIG. 7, the bracket 12 is located at the second position, the second magnetic portion 22A is distant from the first end 30, and the fourth magnetic portion 22B moves close to the second end 32 (the third magnetic portion). Thus, the curved supporter 20 is descended because the supporting portion 36 is separated from the curved supporter 20, and an attractive force generate from the fourth magnetic portion 22B is applied to the third magnetic portion to drive oscillation of the curved supporter 20. The third magnetic portion can be a magnet or made of paramagnetic material, and the fourth magnetic portion 22B can be a magnet or made of paramagnetic material.

In conclusion, the magnetic keyswitch and the related keyboard of the present invention utilize the movable bracket to change position of the second magnetic portion relative to the curved supporter. The second magnetic portion can be a permanent magnet or an electric magnet, and the curved supporter can be made of magnetic material. The magnetic attractive force is generated since the second magnetic portion moves close to the curved supporter, so as to drive the curved supporter to upwardly push the keycap. The magnetic attractive force is eliminated since the second magnetic portion is distant from the curved supporter, and the keycap can be descended to the second height by the external force (such as the attractive force provide by the fourth magnetic portion 22B shown in FIG. 7). In addition, the supporting portion can support or be separated from the curved supporter according to a movement of the bracket relative to the base, so that the keycap can be descended with the dropping curved supporter to obviously vary the entity structural height of the magnetic keyswitch and the related keyboard. Comparing to the prior art, the magnetic keyswitch and the related keyboard of the present invention have advantages of simple structure and easy assembly, magnetic attractive application for upward/downward movement of the keycap provides stable operational reliability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic keyswitch, comprising:
    a base;
    a keycap capable of moving relative to the base upwardly and downwardly;
    a curved supporter disposed between the keycap and the base and having a first end and a second end, a first magnetic portion being disposed on the first end;
    a bracket capable of sliding relative to the base and being switched between a first position and a second position; and
    a second magnetic portion disposed on the bracket, an attractive force being generated between the second magnetic portion and the first end when the bracket is located at the first position so that the second end supports the keycap at a first height, the attractive force between the first magnetic portion and the second magnetic portion being removed when the bracket moves to the second position, and the keycap is descended to a second height by an external force.

2. The magnetic keyswitch of claim 1, wherein the curved supporter further includes a protruding portion disposed on the second end to actuate a switch of a thin film circuit board.

3. The magnetic keyswitch of claim 1, wherein the curved supporter further includes a corner end located between the first end and the second end, the bracket further includes a supporting portion, the supporting portion supports the corner end when the bracket is located at the first position, and the supporting portion is separated from the corner end when the bracket is located at the second position.

4. The magnetic keyswitch of claim 3, wherein the base comprises a guiding slot whereon the corner end is slidably disposed, the corner end downwardly moves relative to the guiding slot downwardly since the corner end is separated from the supporting portion.

5. The magnetic keyswitch of claim 4, wherein the bracket further comprises an inclined guiding portion disposed on the supporting portion, the inclined guiding portion is adapted to push the curved supporter so as to move the corner end relative to the guiding slot upwardly.

6. The magnetic keyswitch of claim 4, wherein the guiding slot is an upright long slot.

7. The magnetic keyswitch of claim 1, further comprising:
    at least one lifting mechanism, two ends of the lifting mechanism being respectively connected to the base and the keycap.

8. The magnetic keyswitch of claim 1, wherein the curved supporter is made of magnetic material, and the second magnetic portion is a permanent magnet or an electric magnet.

9. A keyboard, comprising:
    a base;
    a bracket capable of sliding relative to the base and being switched between a first position and a second position; and
    a plurality of magnetic keyswitches movably disposed on the base, each of the plurality of magnetic keyswitches comprises:
        a keycap capable of moving relative to the base upwardly and downwardly;
        a curved supporter disposed between the keycap and the base and having a first end and a second end, a first magnetic portion being disposed on the first end;
        a second magnetic portion disposed on the bracket, an attractive force being generated between the second magnetic portion and the first end when the bracket is located at the first position so that the second end supports the keycap at a first height, the attractive force between the first magnetic portion and the second magnetic portion being removed when the bracket moves to the second position, and the keycap is descended to a second height by an external force.

10. The keyboard of claim 9, wherein the curved supporter further includes a protruding portion disposed on the second end to actuate a switch of a thin film circuit board.

11. The keyboard of claim 9, wherein the curved supporter further includes a corner end located between the first end and the second end, the bracket further includes a supporting portion, the supporting portion supports the corner end when the bracket is located at the first position, and the supporting portion is separated from the corner end when the bracket is located at the second position.

12. The keyboard of claim 11, wherein the base comprises a guiding slot whereon the corner end is slidably disposed, the corner end downwardly moves relative to the guiding slot downwardly since the corner end is separated from the supporting portion.

13. The keyboard of claim 12, wherein the bracket further comprises an inclined guiding portion disposed on the supporting portion, the inclined guiding portion is adapted to push the curved supporter so as to move the corner end relative to the guiding slot upwardly.

14. The keyboard of claim 12, wherein the guiding slot is an upright long slot.

15. The keyboard of claim 9, wherein the magnetic keyswitch further comprises at least one lifting mechanism, two ends of the lifting mechanism are respectively connected to the base and the keycap.

16. The keyboard of claim 9, wherein the curved supporter is made of magnetic material, and the second magnetic portion is a permanent magnet or an electric magnet.

* * * * *